Oct. 21, 1924.
H. V. McDONALD
LOCK WASHER
Filed March 19, 1924
1,512,551
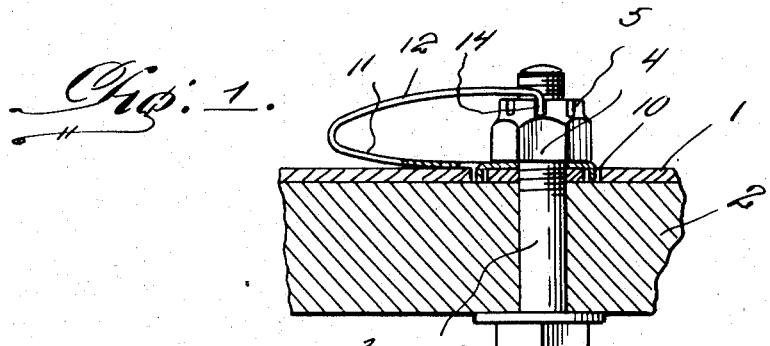
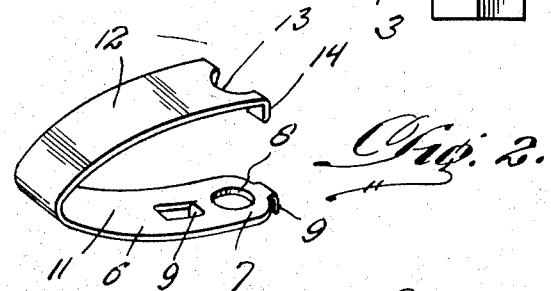
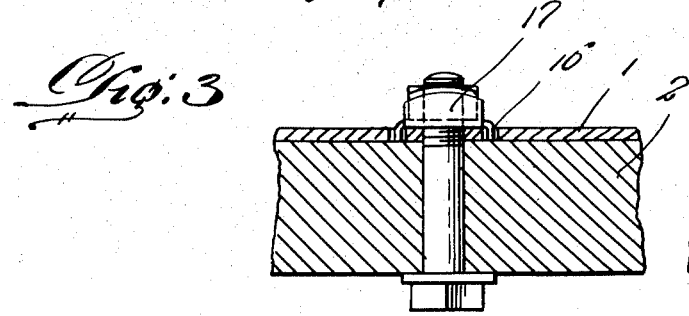
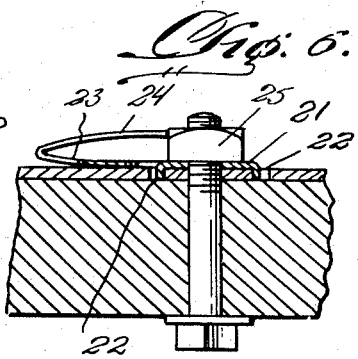
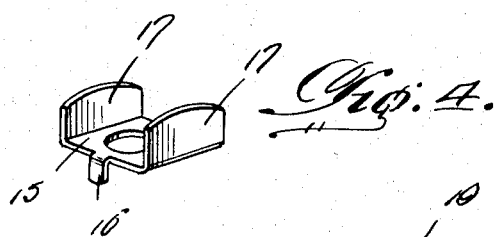
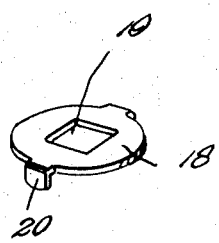
H. V. McDonald,
Inventor
Attorney Patented Oct. 21, 1924.

1,512,551

UNITED STATES PATENT OFFICE.

HERSCHEL V. McDONALD, OF TAYLORVILLE, ILLINOIS.

LOCK WASHER.

Application filed March 19, 1924. Serial No. 700,327.

*To all whom it may concern:*

Be it known that I, HERSCHEL V. McDONALD, a citizen of the United States, residing at Taylorville, in the county of Christian and State of Illinois, have invented certain new and useful Improvements in Lock Washers, of which the following is a specification.

This invention relates to improvements in lock washers.

The invention comprehends the provision of a lock washer having its base portion formed with an opening to receive a bolt, and provided with laterally projected tongues in this base portion adapted to embed in openings in the plates or members to be secured together, for preventing rotation of the washer, the base portion being provided with an extension doubled upon itself to form a spring member provided with a bifurcated end portion having the terminals extended downwardly toward the base portion of the washer and adapted for engagement in the cotter pin slots formed in a nut adapted to lock the nut against rotation on the washer.

The invention also comprehends improvements in the specific construction of the lock washer which is more particularly described in the following description and claims directed to a preferred form of the invention, it being understood however that variations may be made within the scope of the appended claim.

In the drawing forming a part of this application,

Figure 1 shows a sectional view through a pair of plates secured together by a bolt and nut to which the washer forming the subject matter of this invention is applied.

Figure 2 is a detail perspective view of the lock washer.

Figure 3 is a view similar to Figure 1, showing a slightly different form of lock washer.

Figure 4 is a perspective view of the washer shown in Figure 3.

Figure 5 is a detail perspective view of a dish washer having projections to prevent the rotation thereof on the members to which it is secured.

Figure 6 is a view similar to Figure 1 showing a form of lock washer similar to that shown in Figure 1, in which the extensions on the terminal of the spring portion are omitted.

1 and 2 indicate a pair of springs which are secured together by a bolt 3 having a nut 4 threadedly mounted thereon, which is provided with the usual cotter pin slots 5. The improved lock washer is indicated generally at 6 and is formed of a base portion 7 apertured at 8 for receiving the bolt 3 and provided with a pair of laterally projected tongues 9 formed of the material of the base portion and adapted to project downwardly into openings 10 in the plate 1, so that when the base portion 7 is secured against the plate 1, by the nut 4, the projections 9 will seat in the openings and prevent the washer from turning relative to the plate. An extension 11 is provided from the base portion which has a return bend 12, the end of which extends to a point over the central portion of the aperture 8 where the return bend is bifurcated as indicated at 13, forming a pair of spaced end terminals which are projected laterally with respect to the return bend 12 and downwardly as indicated at 14 so that the terminals 14 will seat in the cotter pin slots 5 of the nut 4 and lock the same against rotation on the bolt 3. The extension 11 and the return bend 12 are formed of resilient material so that the spring tendency of the return bend 12 is to force the ends 14 toward the base portion 7. It will be readily seen from this construction that when the return bend 12 is forced away from the extension 11, that the downward projections 14 of the bifurcated ends 13 of the return bend are forced out of the cotter pin slots 5 of the nut so that the same may be removed from the bolt.

In Figures 3 and 4, the washer is indicated at 15 having tongues 16 projected downwardly from the sides thereof similar to the tongues 9 and adapted to project into the openings in the plate 1, while the ends of the washer 15 are adapted to be turned upwardly as indicated at 17 for brushing the sides of the nut and thereby preventing the same from rotating.

The construction shown in Figure 5 is adapted to be used for the bolt having a squared shank, so that the disk 18 provided with a squared opening 19, will fit over the squared shank and be held against rotation thereon, said disk being provided at diametrically opposite points with laterally projecting tongues 20 adapted to extend into the openings 10 in the plate 1 for preventing rotation of the washer or the bolt in an obvious manner.

In Figure 6, the construction is substantially similar to Figure 1 having a lock washer wherein the base portion is indicated at 21 having the lateral tongues 22 projecting therefrom and adapted to seat in the openings in the plate, an extension 23 being provided with a return bend 24 having a square end portion adapted to be projected by the resiliency of the return bend 24 into contact with the outer side of the nut 25 so that the same will be prevented from turning on the bolt.

From the foregoing description, it will be seen that a novel and convenient form of washer has been provided for bolts provided with a spring arm having a return bend adapted for cooperation with the nut so that the natural resiliency of the arm will hold the return bend in engagement with the nut for preventing the same from turning on the bolt.

What is claimed is:

A lock washer, comprising a strip, having one end forming a base portion provided with an aperture adapted to fit over a bolt, said base portion being provided with a pair of laterally projecting tongues for seating in a plate to prevent rotation of the washer, the remaining portion of the strip forming a resilient arm and having a return bend formed with a bifurcated end portion having the terminals extended laterally thereto and normally directed toward the base portion by the resiliency of the return bend and the arm extension, whereby when the washer is positioned on the bolt and the nut threaded on said bolt having cotter pin slots, the terminals on said return bend will engage said slots for locking the bolt against rotation.

In testimony whereof I affix my signature.

HERSCHEL V. McDONALD.